US009996950B2

(12) United States Patent
Watari et al.

(10) Patent No.: US 9,996,950 B2
(45) Date of Patent: *Jun. 12, 2018

(54) IMAGE PROCESSING METHOD DISPLAYING PROCESSED IMAGE REPRESENTING RESULT OF COLOR MODIFICATION PROCESS

(71) Applicant: BROTHER KOGYO KABUSHIKI KAISHA, Nagoya-shi, Aichi-ken (JP)

(72) Inventors: Takahiko Watari, Nagoya (JP); Tatsuya Sato, Ichinomiya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/675,301

(22) Filed: Aug. 11, 2017

(65) Prior Publication Data

US 2017/0345188 A1  Nov. 30, 2017

Related U.S. Application Data

(60) Continuation of application No. 15/268,860, filed on Sep. 19, 2016, now Pat. No. 9,761,018, which is a (Continued)

(30) Foreign Application Priority Data

Jun. 21, 2007 (JP) .................................. 2007-163768

(51) Int. Cl.
G06T 11/00 (2006.01)
H04N 1/46 (2006.01)
(Continued)

(52) U.S. Cl.
CPC .......... G06T 11/001 (2013.01); G06F 3/1208 (2013.01); G09G 5/06 (2013.01);
(Continued)

(58) Field of Classification Search
CPC .......... G06T 2207/30216; G06T 5/003; G06T 2200/24; G06F 3/1256; G06F 3/1208; G06F 3/04817; G06F 3/1207; H04N 1/0044
See application file for complete search history.

(56) References Cited

U.S. PATENT DOCUMENTS 5,963,204 A   10/1999   Ikeda et al.
6,453,078 B2   9/2002   Bubie et al.
(Continued)

FOREIGN PATENT DOCUMENTS

JP   2000-215322 A   8/2000
JP   2003-305027 A   10/2003
(Continued)

OTHER PUBLICATIONS

Japan Patent Office, Office Action for Japanese Patent Application No. 2007-171253 (related to co-pending U.S. Appl. No. 13/692,671), dated Aug. 23, 2011.

(Continued)

Primary Examiner — Jeffrey Chow
(74) Attorney, Agent, or Firm — Merchant & Gould P.C.

(57) ABSTRACT

An image processing method includes: (a) displaying a plurality of candidate image processes to be performed on image data, the plurality of candidate image processes including a color modification process; (b) receiving an instruction indicating the color modification process selected from among the plurality of candidate image processes; (c) displaying a display image corresponding to the image data on the display; (d) designating a display image; and (e) displaying a processed display image that represents a result of the selected color modification process performed on the image data corresponding to the designated display image before the selected color modification process on the (Continued)

image data corresponding to the designated display image is performed.

12 Claims, 11 Drawing Sheets

Related U.S. Application Data continuation of application No. 14/516,637, filed on Oct. 17, 2014, now Pat. No. 9,451,101, which is a continuation of application No. 14/076,154, filed on Nov. 8, 2013, now Pat. No. 8,866,844, which is a continuation of application No. 13/692,671, filed on Dec. 3, 2012, now Pat. No. 8,581,928, which is a division of application No. 12/153,841, filed on May 27, 2008, now Pat. No. 8,325,204.

(51) Int. Cl.
*G06F 3/12* (2006.01)
*H04N 1/00* (2006.01)
*H04N 1/60* (2006.01)
*G09G 5/06* (2006.01)
*H04N 1/23* (2006.01)

(52) U.S. Cl.
CPC ..... *H04N 1/00023* (2013.01); *H04N 1/00042* (2013.01); *H04N 1/00392* (2013.01); *H04N 1/00408* (2013.01); *H04N 1/00411* (2013.01); *H04N 1/00413* (2013.01); *H04N 1/00442* (2013.01); *H04N 1/00453* (2013.01); *H04N 1/00461* (2013.01); *H04N 1/00482* (2013.01); *H04N 1/2307* (2013.01); *H04N 1/2338* (2013.01); *H04N 1/46* (2013.01); *H04N 1/60* (2013.01); *G06T 2200/24* (2013.01); *H04N 2201/0089* (2013.01); *H04N 2201/0094* (2013.01); *H04N 2201/325* (2013.01); *H04N 2201/3242* (2013.01); *H04N 2201/3273* (2013.01)

(56) References Cited

U.S. PATENT DOCUMENTS

| | | |
|---|---|---|
| 6,701,011 B1 | 3/2004 | Nakajima |
| 6,750,890 B1 | 6/2004 | Sugimoto |
| 7,570,839 B1 | 8/2009 | Mages |
| 7,688,332 B2 | 3/2010 | Yoshio et al. |
| 2002/0033959 A1 | 3/2002 | Ando et al. |
| 2002/0140740 A1 | 10/2002 | Chen |
| 2003/0194117 A1 | 10/2003 | Okuzawa |
| 2004/0160630 A1 | 8/2004 | Iriyama et al. |
| 2006/0181750 A1 | 8/2006 | Lu et al. |
| 2007/0052819 A1 | 3/2007 | Nakao et al. |
| 2007/0074115 A1 | 3/2007 | Patten et al. |
| 2007/0136208 A1 | 6/2007 | Hamashima et al. |
| 2008/0252593 A1 | 10/2008 | Fukuta |

FOREIGN PATENT DOCUMENTS

| | | |
|---|---|---|
| JP | 2004-056641 A | 2/2004 |
| JP | 2004-056782 A | 2/2004 |
| JP | 2004-070912 A | 3/2004 |
| JP | 2005-096301 A | 4/2005 |
| JP | 2006-067235 A | 3/2006 |

OTHER PUBLICATIONS

Patent Office of the People's Republic of China, Decision on Rejection for Chinese Patent Application No. 200810129558.4 (related to co-pending U.S. Appl. No. 13/692,671 ), dated Mar. 3, 2011.

FIG.3(c)

| X5Y2 | X4Y2 | X3Y2 P1 | X2Y2 P4 | X1Y2 P7 | X0Y2 P10 |
|---|---|---|---|---|---|
| X5Y1 | X4Y1 | X3Y1 P2 | X2Y1 P5 | X1Y1 P8 | X0Y1 P11 |
| X5Y0 | X4Y0 | X3Y0 P3 | X2Y0 P6 | X1Y0 P9 | X0Y0 P12 |

CONTENT OF IMAGE PROCESS TYPE STORAGE AREA 231

FIG.3(d)

| X5Y2 | X4Y2 | X3Y2 RIGHT-HANDED ROTATION | X2Y2 LEFT-HANDED ROTATION | X1Y2 SEPIA | X0Y2 ORDER SPECIFICATION |
|---|---|---|---|---|---|
| X5Y1 | X4Y1 | X3Y1 FRAMELESS | X2Y1 RED EYE CORRECTION | X1Y1 MONOCHROME | X0Y1 DATE STAMPING |
| X5Y0 | X4Y0 | X3Y0 FRAMED | X2Y0 EXPOSURE COMPENSATION | X1Y0 NUMBER SPECIFICATION | X0Y0 CHARACTER SPECIFICATION |

CONTENT OF IMAGE PROCESS TYPE STORAGE AREA 231

FIG.4
CONTENT OF DETERMINED IMAGE PROCESS STORAGE AREA 234

| IMAGE | ATTRIBUTE INFORMATION |
|---|---|
| P1 | SEPIA |
| P2 | SEPIA + RIGHT-HANDED ROTATION |
| P3 | SEPIA |
| ⋮ | ⋮ |

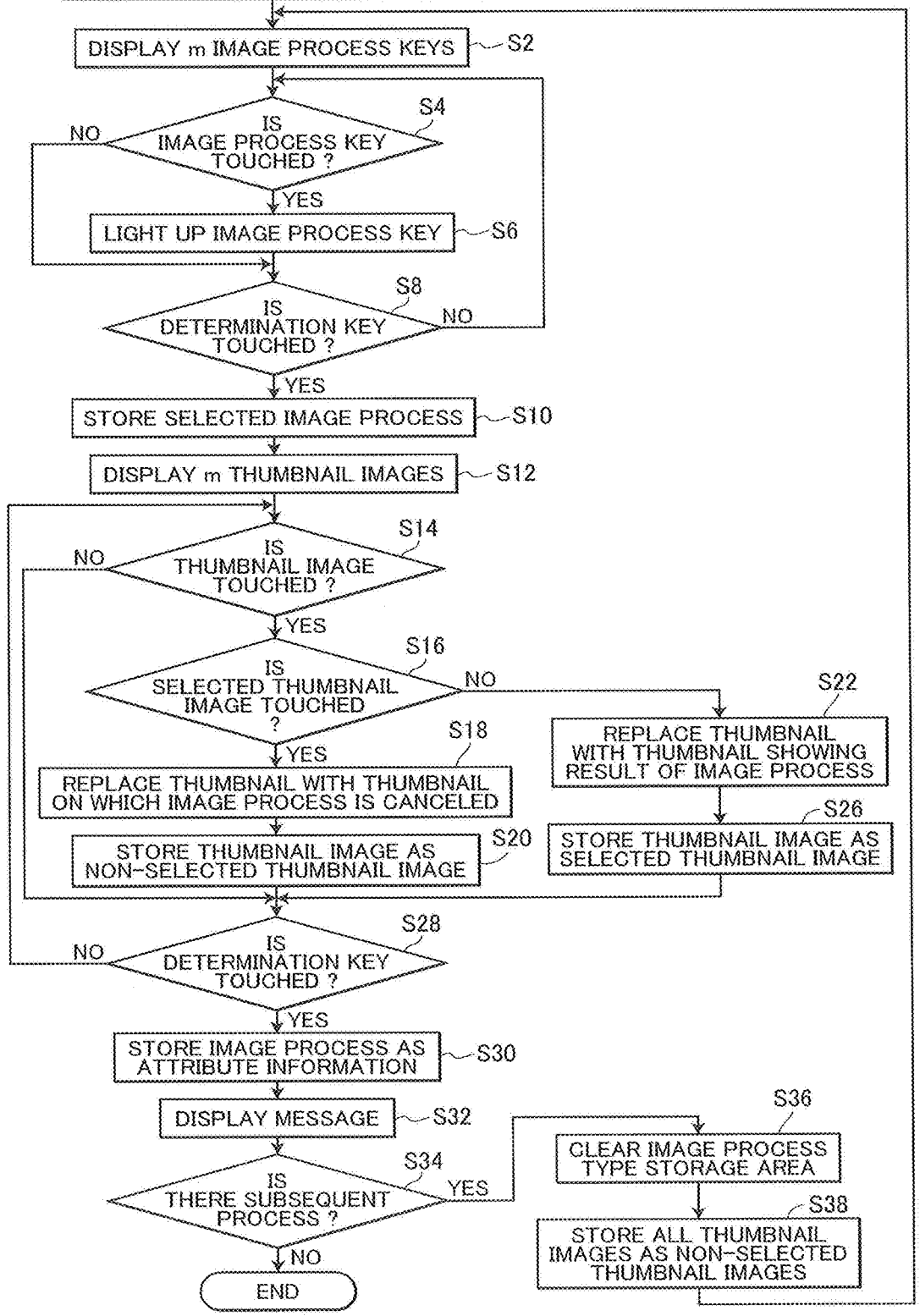

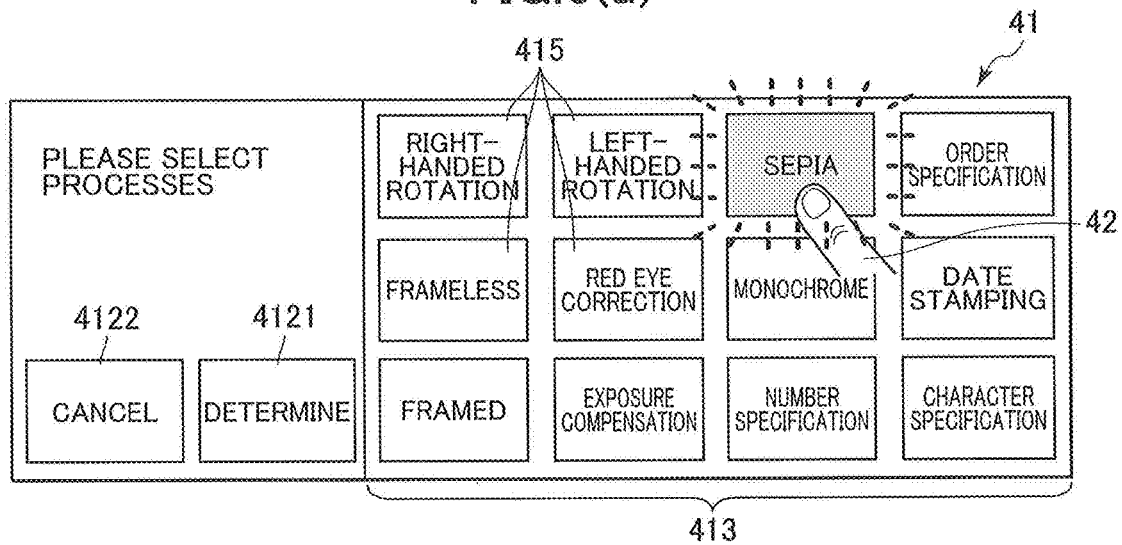
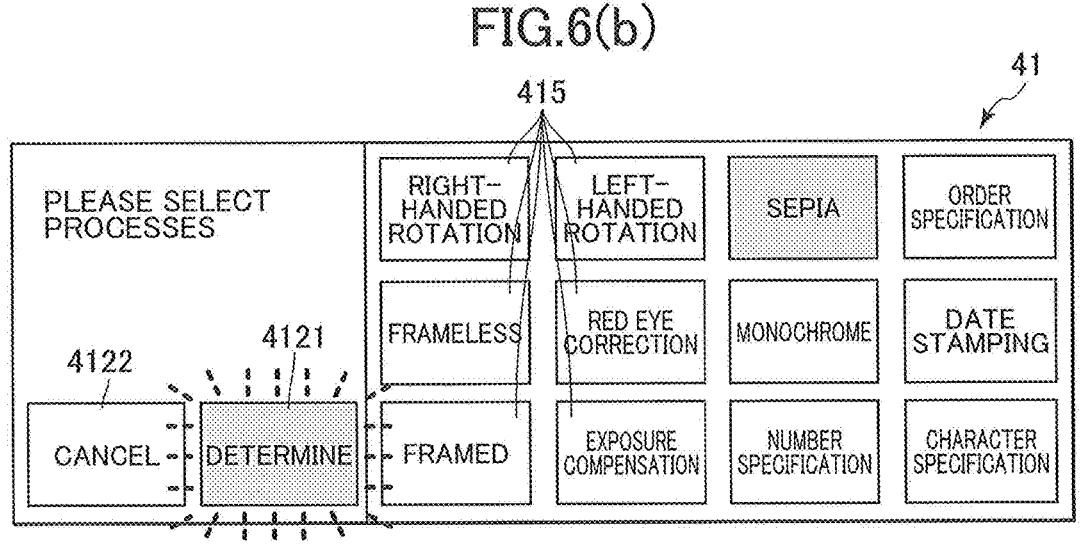

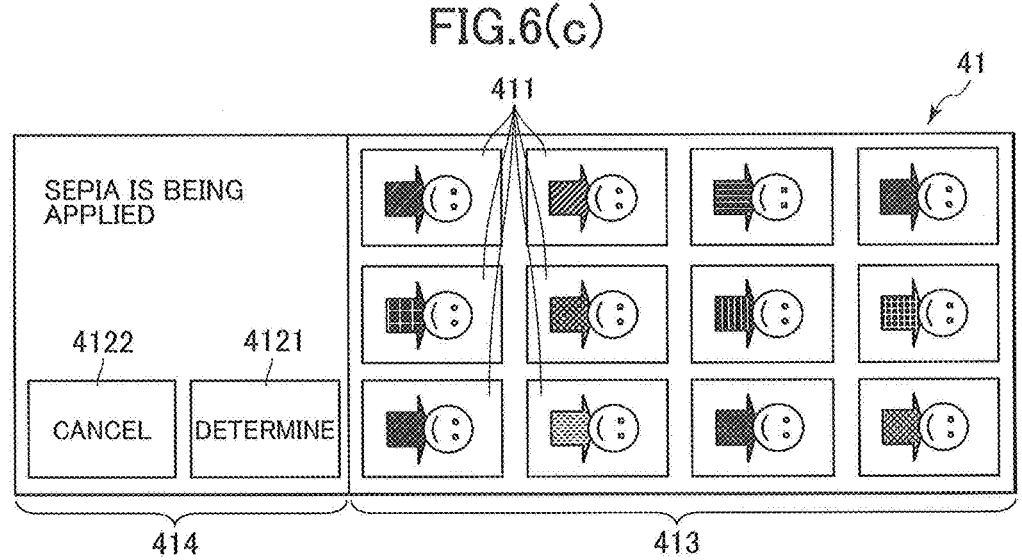
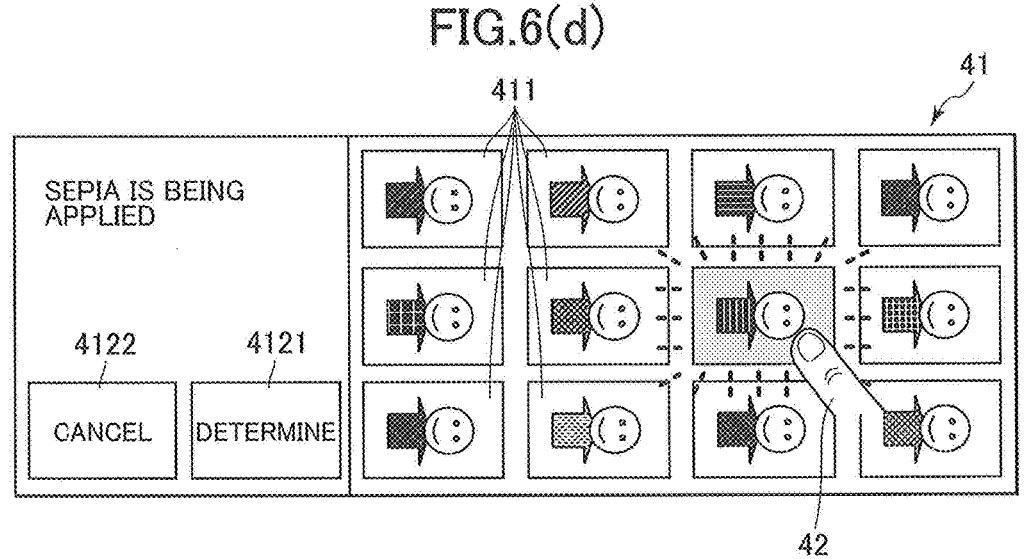

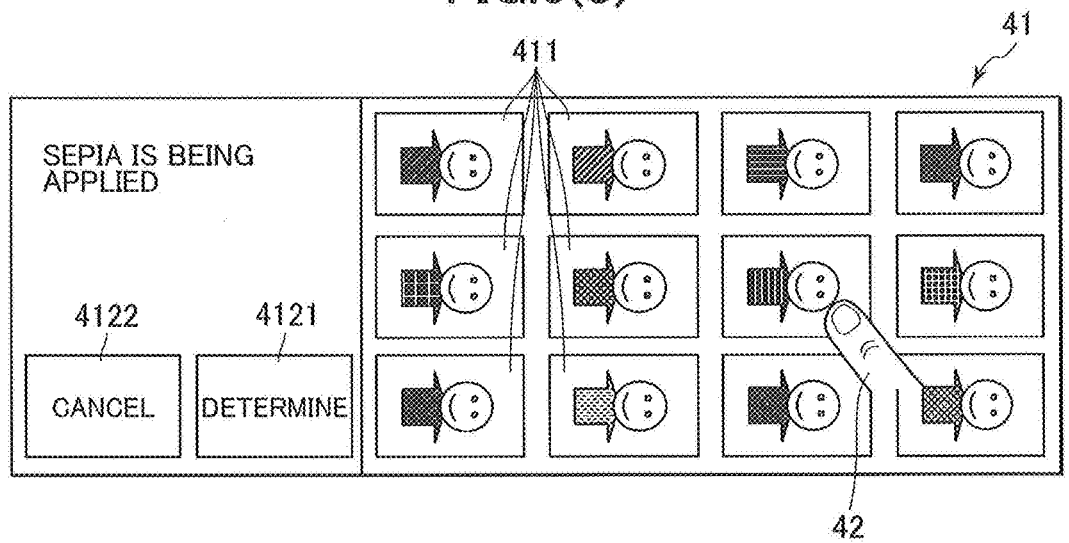
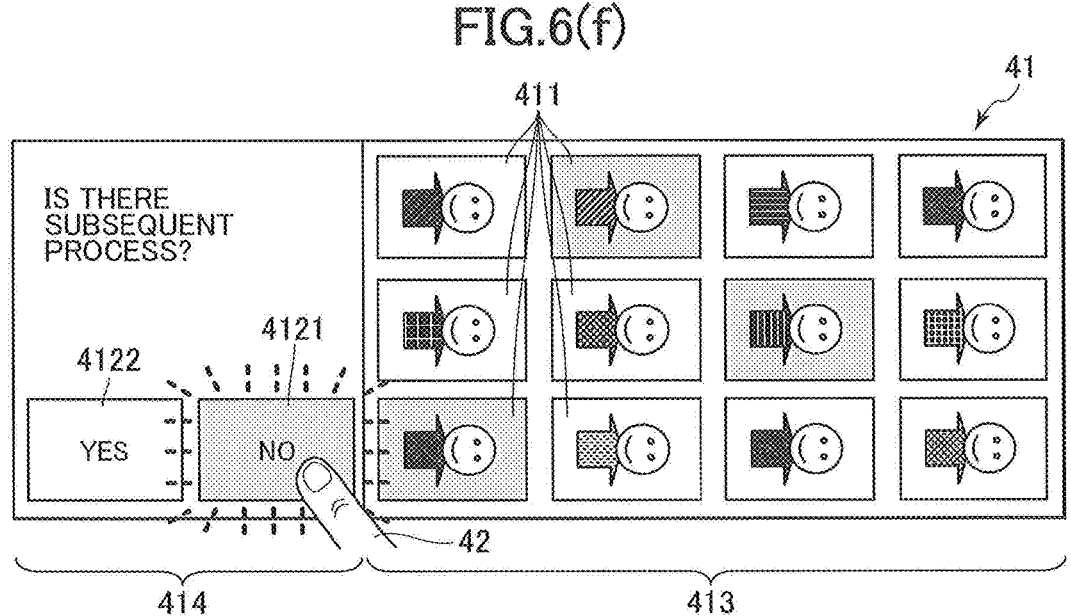

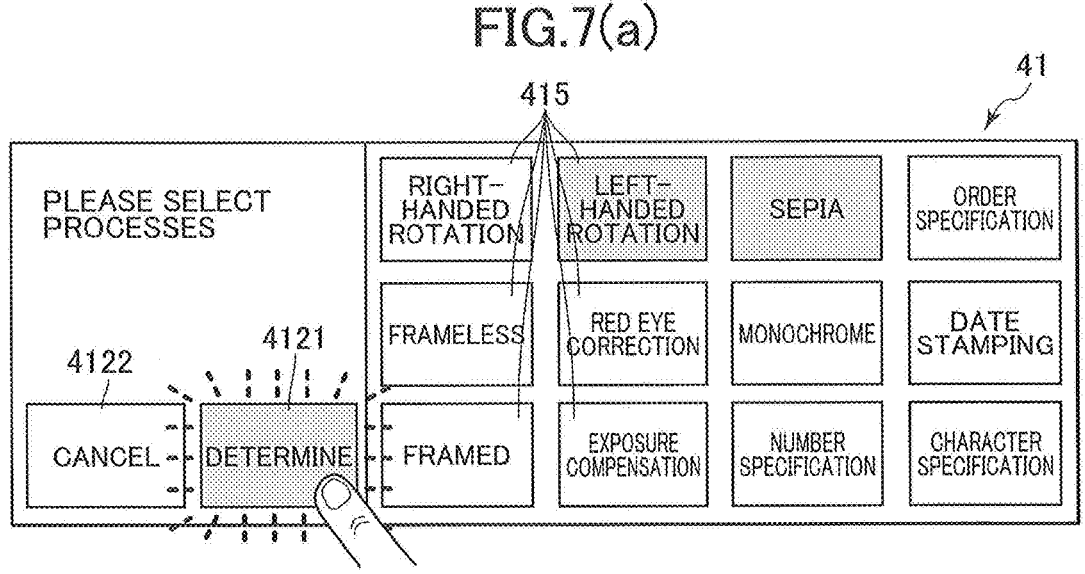
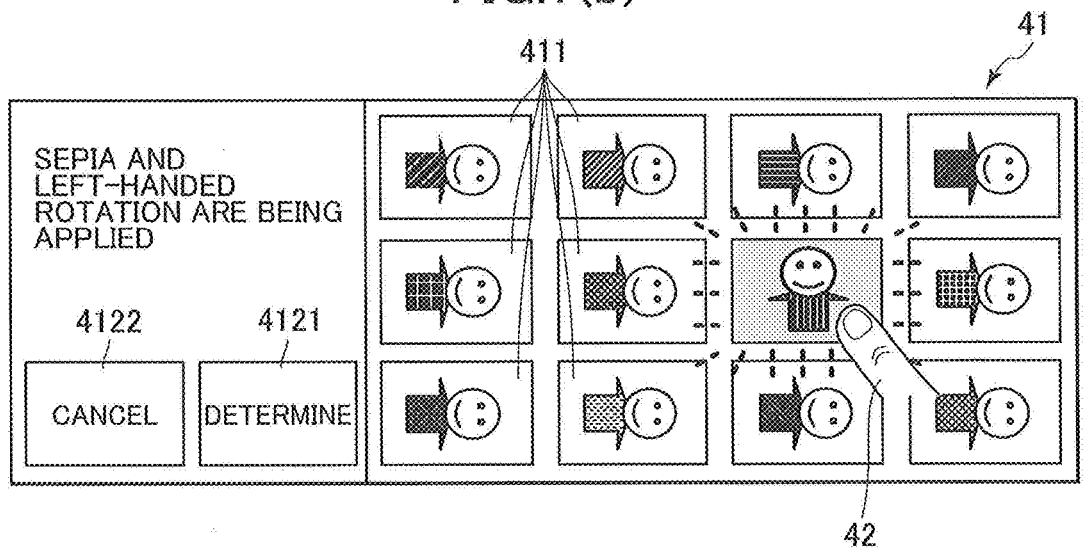

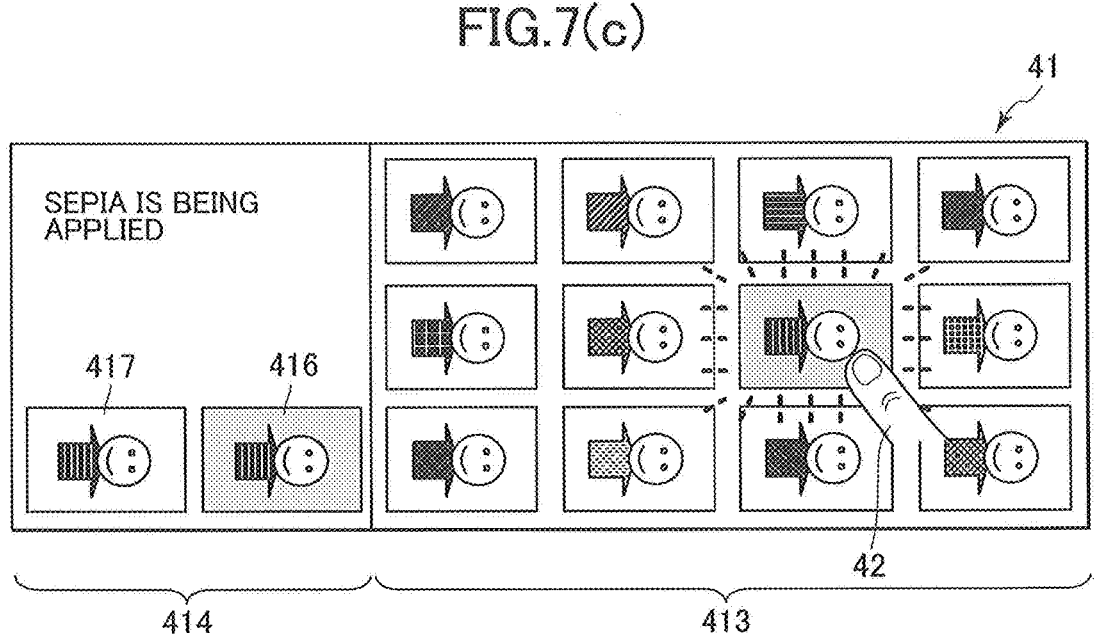

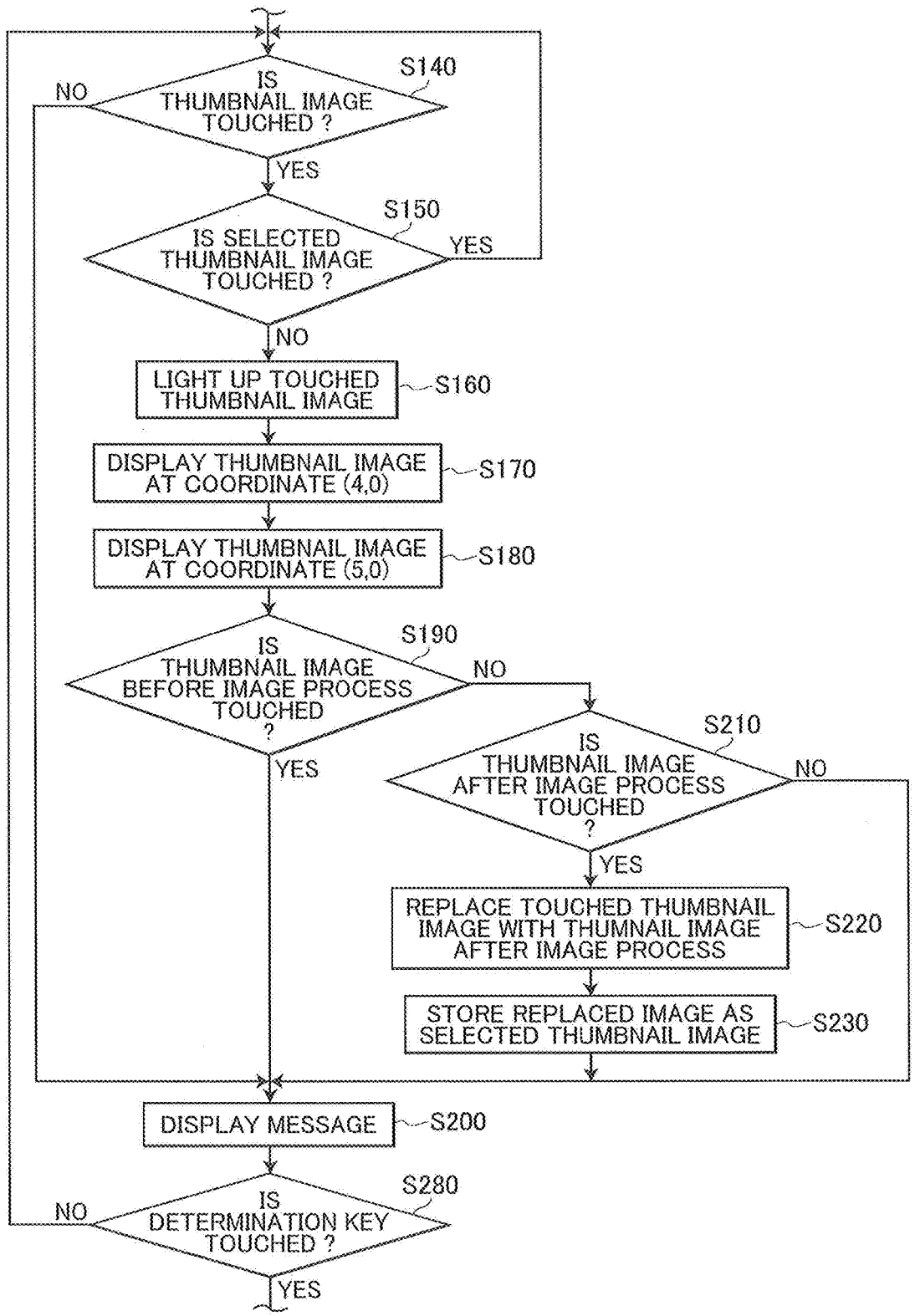

IMAGE PROCESSING METHOD DISPLAYING PROCESSED IMAGE REPRESENTING RESULT OF COLOR MODIFICATION PROCESS

CROSS REFERENCE TO RELATED APPLICATION

This application is a continuation of U.S. application Ser. No. 15/268,860, filed Sep. 19, 2016, which is a continuation of U.S. patent application Ser. No. 14/516,637, filed Oct. 17, 2014, now U.S. Pat. No. 9,451,101, which is a continuation of U.S. application Ser. No. 14/076,154, filed Nov. 8, 2013, now U.S. Pat. No. 8,866,844, which is a continuation of U.S. application Ser. No. 13/692,671, filed Dec. 3, 2012, now U.S. Pat. No. 8,581,928, which is a divisional of U.S. application Ser. No. 12/153,841 filed May 27, 2008, now U.S. Pat. No. 8,325,204, which claims priority from Japanese Patent Application No. 2007-163768 filed Jun. 21, 2007. The entire contents of the above noted applications are incorporated herein by reference.

TECHNICAL FIELD

The invention relates to an image processing apparatus, an image processing method, and an image processing program and, more particularly, to an image processing apparatus, an image processing method, and an image processing program allowing a user to readily visually confirm a result of determined image process and having good operability.

BACKGROUND

Image processing apparatuses capable of applying various image processes such as color tone correction or rotation to image data taken by an electronic camera, for example, are well known in the art. Such image processing apparatuses display thumbnail images which are reduced images on the screen thereof so as to allow a user to confirm a plurality of input image data at sight. One such image processing apparatus disclosed in Japanese Patent Application Publication No. 2000-215322 applies predetermined image process to a thumbnail image that has been selected as image data to be processed by a user and displays a result of the image process on the screen thereof.

SUMMARY

However, in most cases, the user determines, through a trial and error process, which image process is to be applied to respective image data. Thus, the conventional arts disclosed in Japanese Patent Application Publication No. 2000-215322 make user operation cumbersome and complicated.

In order to attain the above and other objects, the invention provides an image processing method. The image processing method includes: (a) displaying a plurality of candidate image processes to be performed on image data, the plurality of candidate image processes including a color modification process; (b) receiving an instruction indicating the color modification process selected from among the plurality of candidate image processes; (c) displaying a display image corresponding to the image data on the display; (d) designating a display image; and (e) displaying a processed display image that represents a result of the selected color modification process performed on the image data corresponding to the designated display image before the selected color modification process on the image data corresponding to the designated display image is performed.

According to another aspects, the invention provides an image processing apparatus. The image processing apparatus includes a display, a process display unit, a process receiving unit, an image display unit, and an image designating unit. The process display unit is configured to display on the display a plurality of candidate image processes to be performed on image data. The plurality of candidate image processes includes a color modification process. The process receiving unit is configured to receive an instruction indicating the color modification process selected from among the plurality of candidate image processes. The image display unit is configured to display a display image corresponding to the image data on the display. The image designating unit is configured to designate a display image. The image display unit is configured to display a processed display image that represents a result of the selected color modification process performed on the image data corresponding to the designated display image before the selected color modification process on the image data corresponding to the designated display image is performed.

BRIEF DESCRIPTION OF THE DRAWINGS

Embodiments in accordance with the invention will be described in detail with reference to the following figures wherein:

FIG. 3(c) shows a storage content of a position information storage area when the thumbnail images are displayed on the touch panel;

FIG. 3(d) shows a storage content of the position information storage area when the image process keys are displayed on the touch panel;

FIG. 4 is a view schematically showing a configuration of a determined image process storage area;

FIG. 5 is a flowchart showing a thumbnail image display process executed by the multifunction peripheral;

FIG. 6(a) shows an example of the display screen of the touch panel displaying the image process keys when an image process key is touched by a user;

FIG. 6(b) shows an example of a display screen of the touch panel when a determination key is touched by the user;

FIG. 6(c) shows an example of the display screen of the touch panel when the steps S12 is executed;

FIG. 6(d) is a view showing an example of the display screen of the touch panel on which a thumbnail image that has been touched by the user is replaced with a thumbnail image representing a result of an image process result "sepia";

FIG. 6(e) is a view showing an example of the display screen of the touch panel where the selected thumbnail image representing the result of the image process "sepia" is replaced with a thumbnail image representing a result obtained by canceling the image process "sepia";

FIG. 6(f) is a view showing an example of the display screen which displays a message in a dialogue area;

FIG. 7(a) is a view showing an example of the display screen of the touch panel when two image processes "sepia" and "left-handed rotation" have been determined;

FIG. 7(b) is a view showing an example of the display screen of the touch panel showing a result of the image process when two image processes "sepia" and "left-handed rotation" are simultaneously applied to the thumbnail image;

FIG. 7(c) is a view showing an example of the display screen of the touch panel in the multifunction peripheral according to a second embodiment; and FIG. 8 is a flowchart showing a part of thumbnail image display process performed in the multifunction peripheral according to the second embodiment.

DETAILED DESCRIPTION

Figure 1:
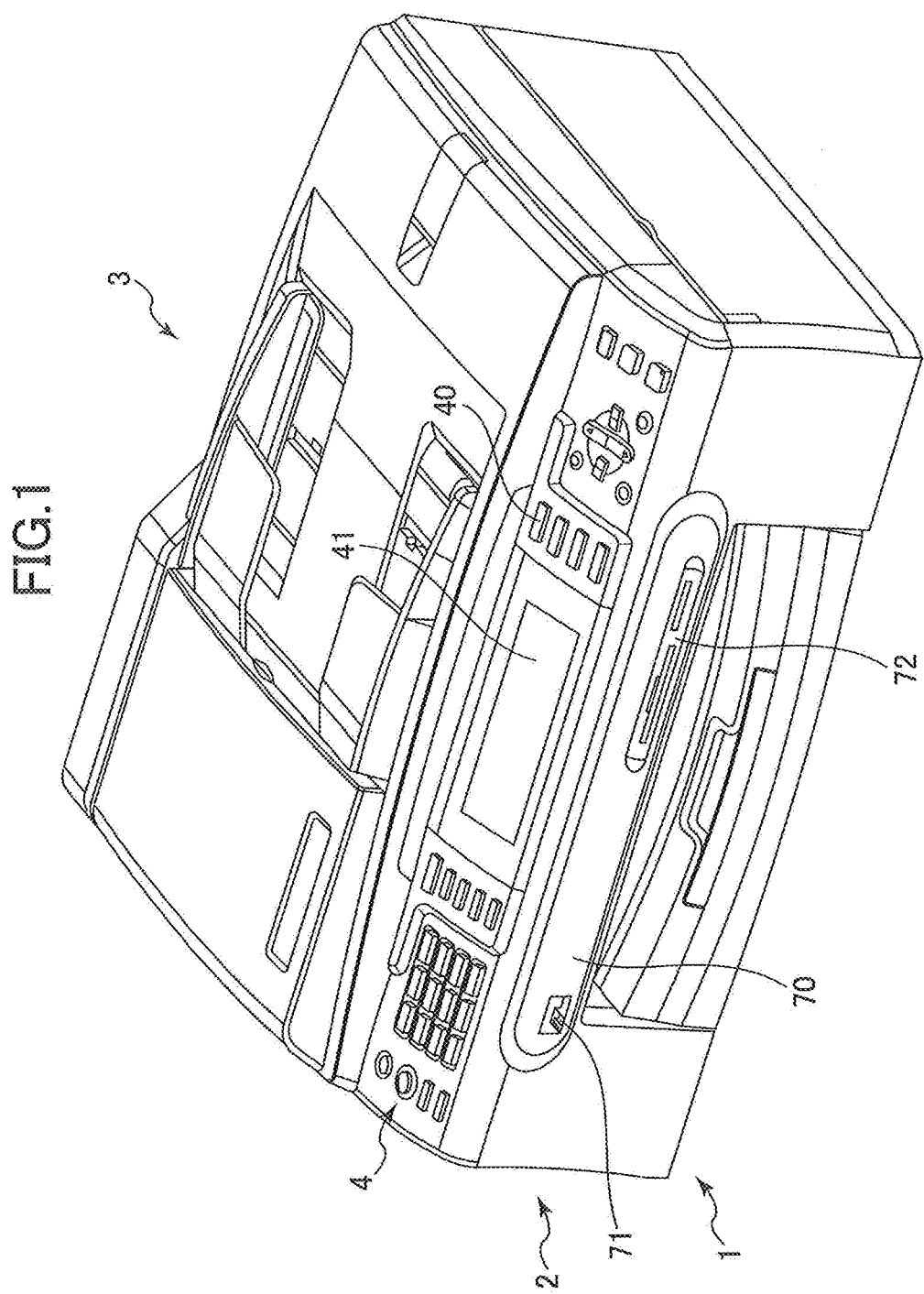
FIG. 1 is a perspective view showing the outer structure of a multifunction peripheral according to an embodiment.

A first embodiment of the invention will be described while referring to the accompanying drawings. FIG. 1 is a perspective view showing the outer structure of a multifunction peripheral (MFP) 1 according to the embodiment. As shown in FIG. 1, the multifunction peripheral 1 is integrally configured of a printer 2 disposed on the bottom, a scanner 3 disposed on the top, and a control panel 4 provided on the front surface of the scanner 3. The multifunction peripheral 1 implements a copier function, and a facsimile function, a printer function to record (print) image based on data received from external devices such as a personal computer (PC) on a recording sheet.

The multifunction peripheral 1 includes a connection panel 70 below the control panel 4. The connection panel 70 has a USB terminal 71 on the left end side thereof. The USB terminal 71 is a connector terminal for communicably connecting the multifunction peripheral 1 to an external device through a USB connection. The connection panel 70 has a slot portion 72 on the right end side thereof. The slot portion 72 includes a plurality of card slots into which a memory card (card-type memory) can be inserted. When a memory card is inserted into one of the card slots, image data is read out by a controller 20 (see FIG. 2) to be described later from the inserted memory card.

The control panel 4 is provided on the front side of the multifunction peripheral 1. The control panel 4 is used for a user to operate the printer 2 or the scanner 3. The control panel 4 includes various operation keys 40 and a touch panel 41. The user can input a desired instruction by using the control panel 4. When a prescribed instruction is input to the multifunction peripheral 1, the operation of the multifunction peripheral 1 is controlled by the controller 20 (see FIG. 2) based on the input information.

The touch panel 41 has a screen on which various images are displayed and detects a contact of an indicator 42 (see FIGS. 3(a) to 3(d)) such as a finger or a pen with the screen. The user brings the indicator 42 into contact (touch) with information displayed on the touch panel 41 so as to input his or her desired instruction.

Figure 2:
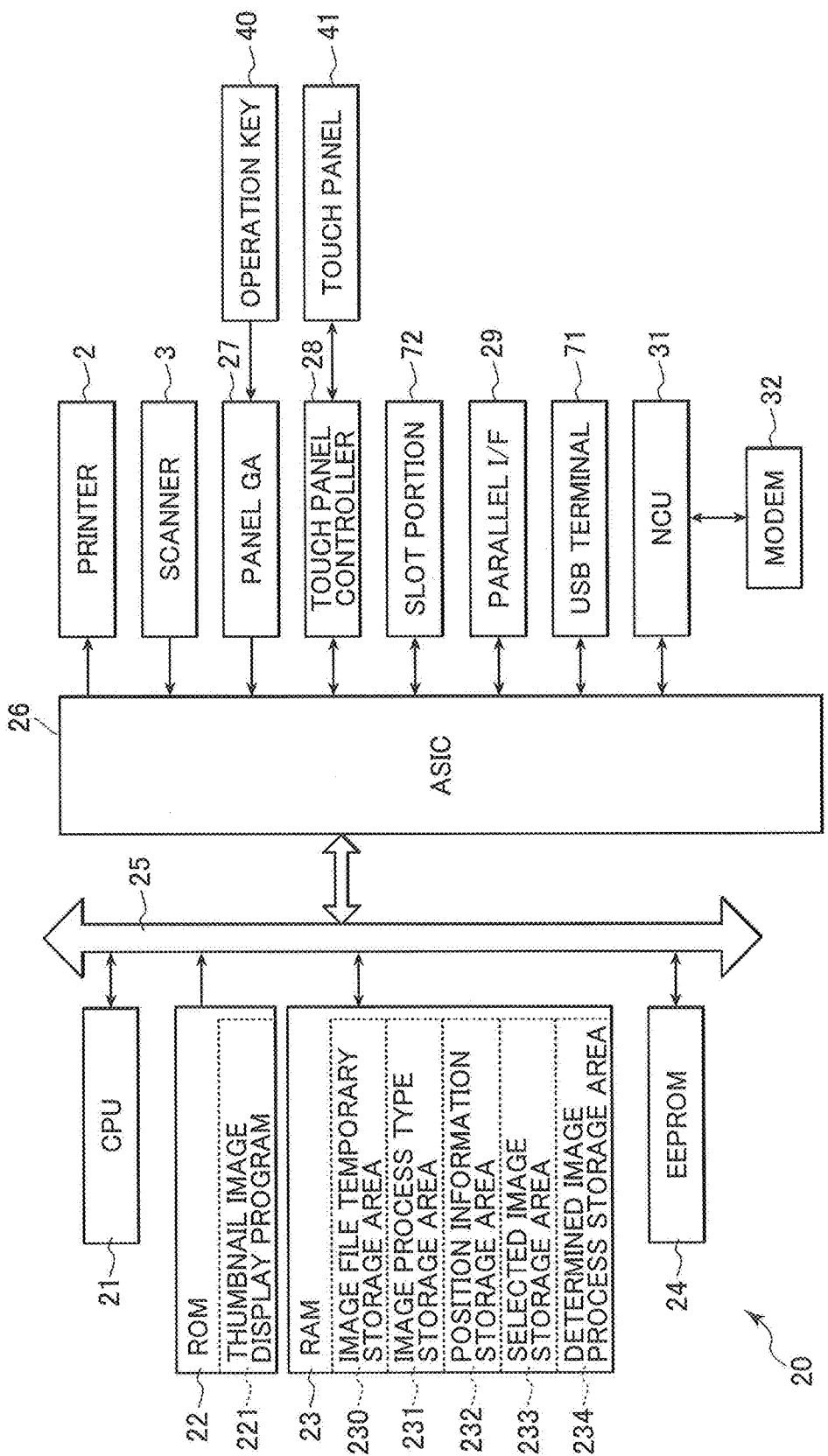
FIG. 2 is a block diagram showing an electrical configuration of the multifunction peripheral.

An electrical configuration of the multifunction peripheral 1 according to the embodiment will next be described with reference to FIG. 2. FIG. 2 is a block diagram showing the electrical configuration of the multifunction peripheral 1. The multifunction peripheral 1 includes a parallel interface (I/F) 29 and the USB terminal 71. The parallel interface 29 is an interface connectable to a PC via a cable. The USB terminal 71 is connectable to a digital camera. The slot portion 72 can detachably mount an external medium (e.g., storage medium such as a memory card or hard disk). With this configuration, image data can be input from the PC, the digital camera, and the external medium to the multifunction peripheral 1. The connection configuration between the multifunction peripheral 1 and the abovementioned devices (PC, digital camera, external medium) is not limited to this. For example, the multifunction peripheral 1 may be connected to the abovementioned devices via a not shown network I/F.

The controller 20 functions to control the overall operations of the multifunction peripheral 1, including the printer 2, the scanner 3, and the control panel 4 (see FIG. 1). The controller 20 is configured of a microcomputer primarily including a central process unit (CPU) 21, a read-only memory (ROM) 22, a random access memory (RAM) 23, and an electrically erasable and programmable ROM (EEPROM) 24, which is a rewritable, nonvolatile storage device. The controller 20 is connected to an application specific integrated circuit (ASIC) 26 via a bus 25.

The CPU 21 is a central process unit for controlling the entire operation of the multifunction peripheral 1. The ROM 22 stores various control programs executed by the CPU 21 and fixed values used when the programs are executed. The ROM 22 stores a thumbnail image display program 221 serving as an image process program. A thumbnail image display process to be described later using FIG. 5 is executed by the thumbnail image display program 221.

The RAM 23 is a rewritable memory used as a memory area for temporarily storing various data or working area when the CPU 21 executes the above program. The RAM 23 has a load area for storing the program which is instructed to be loaded upon activation of the multifunction peripheral 1.

The RAM 23 further has an image file temporary storage area 230, an image process type storage area 231, a position information storage area 232, a selected image storage area 233, and a determined image process storage area 234.

The image file temporary storage area 230 is an area for storing an image file read out from a memory card (not shown) inserted into the slot portion 72. In the embodiment, the image file to be stored in the image file temporary storage area 230 is, for example, JPEG image data which has original image data and thumbnail data that is for displaying the image file (the original image) in a reduced size as additional information.

Figure 3A:
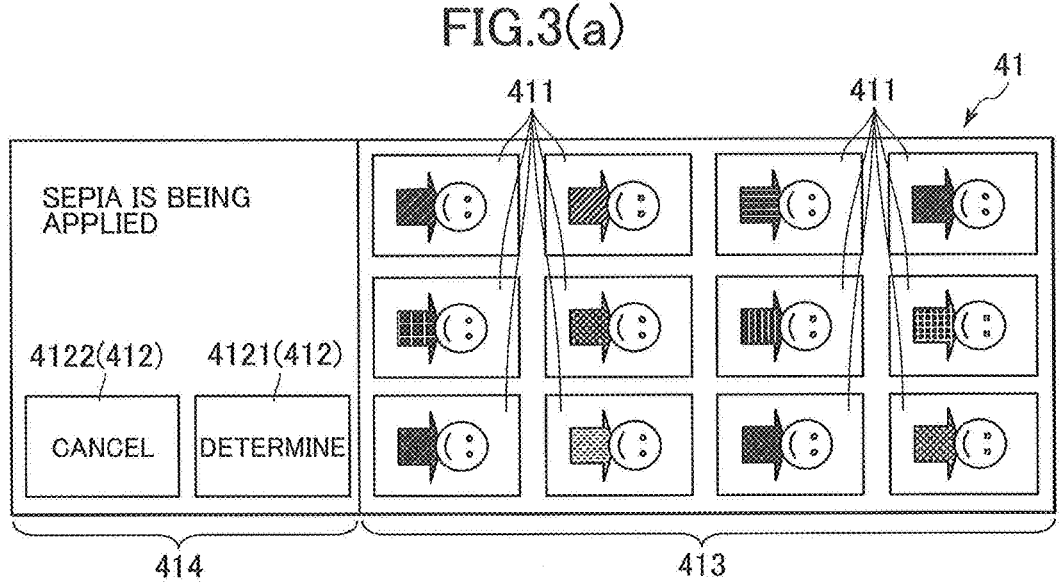
FIG. 3(a) is a view showing an example of a display screen of a touch panel displaying thumbnail images.

With reference to FIG. 3(a), thumbnail images 411 which are displayed on the touch panel 41 based on the thumbnail data added to respective image files will be described below. FIG. 3(a) is a view showing an example of a display screen of the touch panel 41 displaying the thumbnail images 411. Since each of the thumbnail images 411 is a reduced sample image corresponding to each image file read in the image file temporary storage area 230, a large number of thumbnail images 411 can be arranged in a matrix on the touch panel 41, as shown in FIG. 3(a). In FIG. 3(a), 12 thumbnail images 411 are arranged in a 3×4 matrix.

In the embodiment, the display area of the touch panel 41 is divided into a selection area 413 and a dialogue area 414. The thumbnail images 411 are displayed in the selection area 413, while a message to the user and operation keys 412 are displayed in the dialogue area 414. In the example of FIG. 3(a), a determination key 4121 and a cancel key 4122 are displayed as the operation keys 412. The user touches one of the operation keys 412 to thereby make a desired input operation. In the embodiment, the images, such as the determination key 4121 and the cancel key 4122, which are displayed in the dialogue area 414 and which are touched by the user for input of a specific instruction are collectively referred to as operation keys 412.

Returning to FIG. 2, the image process type storage area 231 is an area for storing image process that has been selected from among the image process that the multifunction peripheral 1 can execute. The multifunction peripheral 1 can apply a plurality of kinds of image process to the image file stored in the image process type storage area 231. The image process that the multifunction peripheral 1 can execute includes, for example, "right-handed rotation" that rotates an image in the right-handed direction, "left-handed rotation" that rotates an image in the left-handed direction, "sepia" that corrects the tone of an image into sepia tone, "order specification" that creates order information to images, "frameless" that eliminates a margin portion of an image, "red eye correction" that removes red eye from an image, "monochrome" that converts a color image into a monochrome one, "date stamping" that stamps date onto an image, "framed" that provides a predetermined margin portion on an image, and "exposure compensation" that compensates the brightness of an image.

Figure 3B:
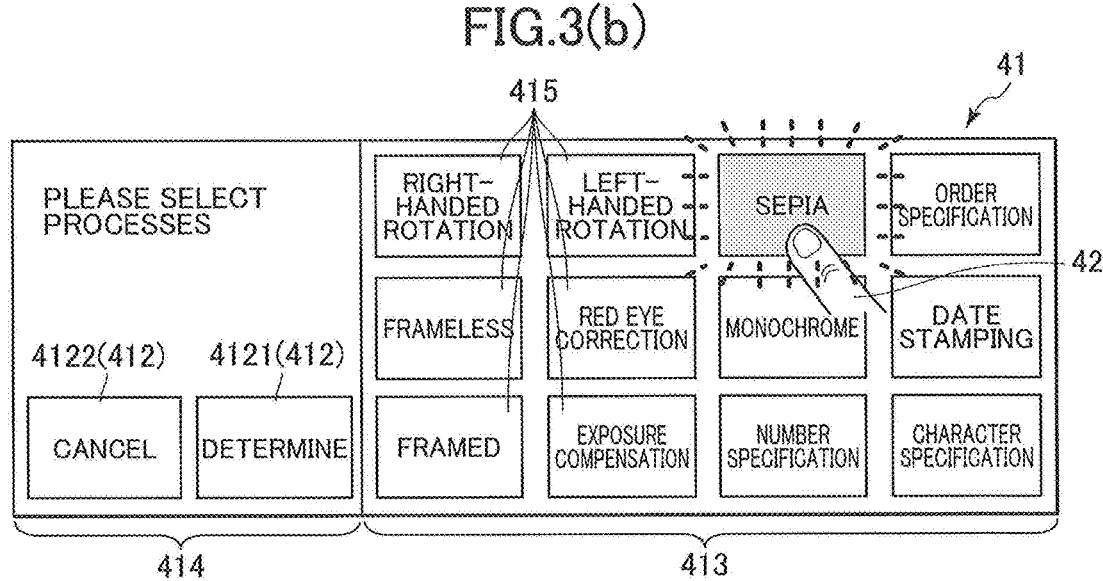
FIG. 3(b) is a view showing an example of the display screen of the touch panel displaying image process keys.

With reference to FIG. 3(b), image process keys 415 will be described below. FIG. 3(b) is a view showing an example of a display screen of the touch panel 41 displaying the image process keys 415. The image process keys 415 are displayed on the touch panel 41 so as to allow the user to designate the image process to be applied. As shown in FIG. 3(b), the image process keys 415 are arranged in a matrix. The image process keys 415 one-to-one correspond to a plurality of image process that the multifunction peripheral 1 can execute. The user selects a given image process key 415 from among the plurality of image process keys displayed on the touch panel 41 and brings the indicator 42, such as a finger, into contact (touch) with the selected image process key 415 displayed on the touch panel 41 so as to instruct image process corresponding to the selected image process key 415. In other words, as shown in FIGS. 3(a) and 3(b), the selection area 413 has 3×4 divided areas that are obtained by dividing the selection are 413 into 3 rows and 4 columns. As shown in FIG. 3(a), each of 3×4 areas displays the thumbnail image 411. As shown in FIG. 3(b), each of 3×4 areas displays the image process key 415.

The image process key 415 touched by the user is lit up like the image process key 415 of "sepia" shown in FIG. 3(b), so as to be distinguished from other image process keys 415. As a result, even if the user touches a wrong key, he or she can quickly recognize the operation error.

The selected image processes are stored in the image process type storage area 231 when the user touches, so as to determine the selected image processes, the determination key 4121 displayed as the operation key 412 on the touch panel 41 in which one or a plurality of image processes are selected.

Returning to FIG. 2, the position information storage area 232 is an area for storing a correspondence between image (for example, the thumbnail image) displayed on the touch panel 41 and position information of the image.

FIGS. 3(c) and 3(d) are views each schematically showing a configuration of the position information storage area 232. FIG. 3(c) shows the storage content of the position information storage area 232 when the thumbnail images 411 are displayed on the touch panel 41, and FIG. 3(d) shows the storage content of the position information storage area 232 when the image process keys 415 are displayed on the touch panel 41.

As shown in FIGS. 3(c) and 3(d), the position information storage area 232 stores a coordinate serving as position information indicating the position of each rectangular area that is obtained by divining the display area of the touch panel 41 into, for example, a 3×6 matrix (3 rows and 6 columns).

The coordinate stored in the position information storage area 232 is represented by an x-coordinate and a y-coordinate in a coordinate system where the observer's lower right of the touch panel 41 is set as the origin, a horizontal direction is set as an x-axis, and a vertical direction is set as a y-axis. In FIG. 3(c), a coordinate in which x-coordinate is i and y-coordinate is j is represented as $XiYj$ where i and j are natural numbers. The touch panel 41 detects a contact of the indicator 42 therewith based on, e.g., a pressure applied thereto and outputs a coordinate of the position at which the contact is detected.

Further, when the thumbnail images 411 are displayed on the touch panel 41 as shown in FIG. 3(a), image file names ($P_1$, $P_2$, . . . ) of the thumbnail images 411 displayed at their respective coordinates are stored in the position information storage area 232 in association with the respective coordinates, as shown in FIG. 3(c).

Further, when the image process keys 415 are displayed on the touch panel 41 as shown in FIG. 3(b), image process names corresponding to the image process keys 415 displayed at their respective coordinates are stored, in place of the abovementioned image file name, in the position information storage area 232 in association with the respective coordinates, as shown in FIG. 3(d).

Thus, by referring to the position information storage area 232 based on the coordinate corresponding to the contact position output by the touch panel 41, the thumbnail image 411 or the image process selected by the user can be identified.

For example, as shown in FIG. 3(d), the image process name "right-handed rotation" is associated with a coordinate X3Y2 on the position information storage area 232, so that when the user touches the "right-handed rotation" key displayed at the coordinate X3Y2, the CPU 21 determines that the user instructs to select "right-handed rotation" based on the coordinate.

Returning to FIG. 2, the selected image storage area 233 is an area for storing information indicating whether each of the thumbnail images 411 displayed on the touch panel 41 is a selected thumbnail image which has been selected by the user or a non-selected thumbnail image which has not been selected by the user. Details of the "selected thumbnail image" and "non-selected thumbnail image" will be described later with reference to FIG. 5.

The determined image process storage area 234 is an area for storing information (attribute information) indicating the image process which has been determined to be applied to each image file stored in the image file temporary storage area 230.

FIG. 4 is a view schematically showing a configuration of the determined image process storage area 234. When the user determines, by using the touch panel 41, an image process and an image file to which the determined image process is to be applied, the determined image process is stored as attribute information of the determined image file. For example, since, as shown in FIG. 4, an image files $P_1$ is associated with "sepia" as the attribute information in the determined image process storage area 234, the image process "sepia" are applied to the image file $P_1$. Further, since image file $P_2$ is associated with the "sepia" and "right-handed rotation" as the attribute information in the determined image process storage area 234, the image processes "sepia" and "right-handed rotation" are applied to the image file $P_2$.

Returning to FIG. 2, the ASIC 26 will be described below. The ASIC 26 is connected to the controller 20 via the bus 25. A panel gate array (panel GA) 27 for controlling the operation keys 40 used for the user to input his or her desired instruction to the multifunction peripheral 1 is connected to the ASIC 26. The panel gate array 27 detects a depression (input operation) of a operation key 40 and outputs a prescribed code signal. Each of operation keys 40 is assigned to a respective code signal (key code). Upon receiving a prescribed key code from the panel gate array 27, the CPU 21 performs requested control process according to a prescribed key process table.

A touch panel controller 28 is connected to the ASIC 26. The touch panel controller 28 is for controlling the display screen of the touch panel 41. The touch panel controller 28 displays, under the control of the CPU 21, an image corresponding to data received from a connected external device or a memory card inserted into the slot portion 72.

Further, an NCU (Network Control Unit) 31 is connected to the ASIC 26. The NCU 31 is connected to a general public line (not shown) so as to realize a facsimile function. In addition, a modem 32 is connected, via the NCU 31 to the ASIC 26.

Next, with reference to FIG. 5 and FIGS. 6(a) to 6(f), the thumbnail image display process will be described. The thumbnail image display process is executed in the multifunction peripheral 1 having the configuration described above. FIG. 5 is a flowchart showing the thumbnail image display process executed by the multifunction peripheral 1, and FIGS. 6(a) to 6(f) are views showing the transition of the display of the touch panel 41. In the following, the flowchart of FIG. 5 will be described with appropriate reference to FIGS. 6(a) to 6(f).

The thumbnail image display process is executed when a memory card is inserted into the slot portion 72 by the user to cause image files stored in the memory card is loaded into the image file temporary storage area 230 (see FIG. 2). When the cancel key 4124 is touched by the user during execution of the thumbnail image display process, this thumbnail image display process is ended.

First, in S2 the CPU 21 controls the touch panel 41 to display m image process keys 415 (see FIG. 3(b)) in the selection area 413. The "m" is a predetermined natural number equal to or more than 2. When the number of image processes to be displayed as choices exceeds the "m", i.e., when the image process keys 415 corresponding to all the image processes cannot be displayed, a cursor key (not shown) may be used to scroll up and down the image process keys 415. FIG. 6(a) shows an example of the touch panel 41 displaying the image process keys 415 to change the image processes keys 415. In this example, 12 image process keys 415 are displayed.

Returning to FIG. 5, and description will now be continued. In S4 the CPU 21 determines whether or not any of image process key 415 has been touched. Concretely, the CPU 21 detects a contact of the indicator 42 with the touch panel 41, and determines whether or not the x-coordinate of the contact position falls between 0 and 3.

When there is a touch on the given image process key 415 (S4: Yes), that is, the CPU 21 detects a contact of the indicator 42 with the touch panel 41, and determines that the x-coordinate of the contact position falls between 0 and 3, in S6 the CPU 21 light up the touched image process key 415. Then, in S8 the CPU 21 determines whether or not the determination key 4121 displayed at a coordinate (4,0) has been touched. When the determination key 4121 has not been touched (S8: No), the CPU 21 returns to S4, and repeats steps S4 and subsequent process. Accordingly, when another image process key 415 is touched (S4: Yes), the CPU 21 light up the touched image process key 415. When any of the image process keys 415 have not been touched (S4: No), the CPU 21 skips S6 and proceeds to S8.

When the user has selects all the desired image process, and touches the determination key 4121 in a state where at least one image process key 415 is lit up (S8: Yes), in S10 the CPU 21 stores, in the image process type storage area 231, each image process corresponding to the lit up image process key 415, that is, image process selected by the user.

FIG. 6(b) shows an example of a display screen of the touch panel 41 when the determination key 4121 is touched by the user. As shown in FIG. 6(b), the user selects a given image process (in this example, "sepia") and touches the determination key 4121 to thereby determine any of the plurality of image processes that can be executed by the multifunction peripheral 1.

Returning to FIG. 5, in S12 the CPU 21 switches the display in the selection area 413 on the touch panel 41 from the m image process keys 415 to m thumbnail images 411.

When the number of the image files that have been loaded is less than m, thumbnail images 411 corresponding to all the loaded image files are displayed on the touch panel 41. When the number of the image files that have been loaded exceeds the "m", i.e., when thumbnail images 411 corresponding to all the image files cannot be displayed, a cursor key (not shown), for example, may be used to scroll up and down the thumbnail images 411 to change the thumbnail images 411.

FIG. 6(c) shows an example of a display screen of the touch panel 41 when the process of S12 is executed. As shown in FIG. 6(c), when the thumbnail images 411 are displayed, a message, such as "sepia is being applied" is displayed so as to allow the user to confirm the image process that has been determined is displayed in the dialogue area 414. Thus, the user can select the thumbnail image while visually confirming the image process to be applied.

Returning to FIG. 5, in S14 the CPU 21 determines whether or not any of thumbnail images 411 displayed on the touch panel 41 has been touched. That is, the touch panel 41 detects the thumbnail image 411 is touched, and then the CPU 21 receives the selection instruction to select the thumbnail image 411 based on the detection of the touch panel 41.

When the CPU 21 determines that the thumbnail image 411 has been touched by the user (S14: Yes), in S16 the CPU 21 refers the selected image storage area 233 that stores information indicating whether each of the thumbnail images 411 is the selected thumbnail image or non-selected thumbnail image. Accordingly, the CPU 21 determines whether or not the touched thumbnail image 411 is the selected thumbnail image that has been selected by the user.

In the initial state, since no selected thumbnail image is displayed on the touch panel 41, the touched thumbnail image 411 is determined not to be the selected thumbnail image (S16: No). Thus, this case (S16: No) will be described. In this case, in S22 the CPU 21 lights up the touched thumbnail image and replaces the touched thumbnail with a thumbnail image representing a result of the image process stored, in association with the touched image, in the image process type storage area 231.

Then, in S26 the CPU 21 stores information indicating that the touched thumbnail image is the selected thumbnail image in the selected image storage area 233, and the CPU 21 proceeds to S28. In the description, the thumbnail image 411 touched by the user and representing a result of the image process stored in the image process type storage area 231 is referred to as "selected thumbnail image" and thumbnail image that has not been touched by the user, that is, thumbnail image which is not the "selected thumbnail image" is referred to as "non-selected thumbnail image".

FIG. 6(d) is a view showing an example of a display screen on which the thumbnail image that has been touched by the user is replaced, in the step S22, with a thumbnail image representing the image process result. As shown in FIG. 6(d), when the user instruct to select the thumbnail image 411, the selected thumbnail image 411 is replaced with a thumbnail image 411 representing a result of the image process (in this case, "sepia" process) that has been previously determined, on the image data corresponding to the selected thumbnail image 411. With this configuration, the user can visually confirm a result of the image process in a moment only by touching the thumbnail image 411. Since the thumbnail images other than the thumbnail image that has been touched by the user are displayed without modification at the same positions. Accordingly, the user can visually confirm a relationship between the thumbnail image representing the image process result and other thumbnail images to thereby determine, in a comprehensive manner, the influence exerted by the image process.

In the embodiment, the image process stored in the image process type storage area 231 is applied to the thumbnail data added to each image file to obtain thumbnail data that has been subjected to the image process. A thumbnail image (e.g., thumbnail image subjected to image process "sepia") representing the process result is displayed based on the obtained thumbnail data. Alternatively, the image process stored in the image process type storage area 231 may be applied to an image file which is the original data of the thumbnail image 411 to obtain an image file that has been subjected to the image process. In this case, thumbnail data is created from the obtained image file. A thumbnail image representing the image process result is displayed based on the created thumbnail data.

Returning to FIG. 5, in S28 the CPU 21 determines whether or not the determination key 4121 displayed at the coordinate (4,0) has been touched. When the determination key 4121 has not been touched (S28: No), the CPU 21 returns to S14, where the determination process is repeated. That is, every time a thumbnail image 411 is touched (S14: Yes), in S16 the CPU 21 determines whether the touched thumbnail image is the selected thumbnail image. When the touched thumbnail image 411 is not the selected thumbnail image (S16: NO), in S22 the CPU 21 replaces the touched thumbnail image with a thumbnail image representing a result of the image process stored, in association with the touched image, in the image process type storage area 231.

Thus, the user can visually confirm the result of the image process that has been determined to be applied to the touched thumbnail image 411 in a moment only by a simple operation of only touching the thumbnail image 411. Further, every time a thumbnail image 411 is touched by the user, the touched thumbnail image 411 is substituted with a thumbnail image 411 representing a result of the image process, so that only a small number of operation is required even in the case where results of the image process applied to a large number of thumbnail images 411 are required to be confirmed, resulting in good operability.

Next, a case (S16: Yes) where the thumbnail image 411 that has been touched by the user is determined to be the selected thumbnail image will be described. As described above, the selected thumbnail image is displayed in a state showing a result when the image process, that is stored in the image process type storage area 231, is performed on the image data corresponding to the selected thumbnail image. Thus, when such a selected thumbnail image is touched, in S18 the CPU 21 replaces the touched thumbnail image with a thumbnail image 411 representing a result of process obtained by canceling the image process stored in the image process type storage area 231, i.e., most recently determined image process. In other words, the CPU 21 replaces the touched thumbnail image representing the result of the image process performed on the image data, with the thumbnail image 411 representing the image data without performing the image process stored in the image process type storage area 231 when the selected thumbnail image is touched by the user. In S20 the CPU 21 stores the thumbnail image that has been touched by the user in the selected image storage area 233 as the non-selected thumbnail image.

FIG. 6(e) is a view showing an example of a state where one selected thumbnail image representing a result of the image process "sepia" is replaced with a thumbnail image 411 representing a process result obtained by canceling the image process "sepia" when the user touches the selected thumbnail image. As shown in FIG. 6(e), a simple operation of touching the selected thumbnail image allows the user to confirm a result of image process obtained by canceling the image process stored in the image process type storage area 231. As a result, the user can adequately determine whether or not the intended image process is applied to image data corresponding to the thumbnail image.

Returning to FIG. 5, in S28 the CPU 21 determines whether or not the determination key 4121 displayed at the coordinate (4,0) has been touched by the user. When the CPU 212 determines that the determination key 4121 has not been touched (S28: No), the CPU 21 returns to S14, and the step S14 and subsequent steps are repeated.

When the CPU 21 determines that the determination key 4121 displayed at the coordinate (4,0) is touched in the above repetition (S28: Yes), in S30 the CPU 21 stores, during the determined image process storage area 234 (see FIG. 4), the image process that is stored in the image process type storage area 231 as attribute information of an image file corresponding to the selected thumbnail image. According to the attributed information, the image process determined by the user is executed for respective image files.

Subsequently, in S32 the CPU 21 controls the touch panel 41 to display, in the dialogue area 414, a message inquiring whether or not there is subsequent process.

FIG. 6(f) is a view showing an example of a state where the message is displayed in the dialogue area 414 by the process of S32. As shown in FIG. 6(f), two operation keys 412 of "Yes" (4122) and "No" (4121) are displayed in the dialogue area 414 so as to allow the user to input his or her answer to the message.

Returning to FIG. 5, when the CPU 21 determines that the operation key 412 of "No" has been touched (S34: No), the CPU 21 ends the process.

When the CPU 21 determines that the operation key 412 of "Yes" has been touched (S34: Yes), in S36 the CPU clears the image process type storage area 231. In S38 the CPU 21 stores, in the selected image storage area 233, all the thumbnail images as the non-selected thumbnail images. Subsequently, the CPU 212 returns to S2, where the CPU 21 switches the display in the selection area 413 on the touch panel 41 from the screen displaying thumbnail images 411 to the screen displaying the image process keys 415, and subsequent steps are repeated.

According to the above procedure, when the user newly determines his or her desired image process, the newly determined image process is stored in the image process type storage area 231 (see FIG. 2). That is, only the image process that has most recently been determined is always stored in the image process type storage area 231. Then, by repeating the same operation procedure, a result of the newly determined image process for a given thumbnail image 411 can be confirmed. Thus, with a simple operation, a result of various types of image process can visually be confirmed.

When in S14 a new image process is selected and determined, the thumbnail images 411 are displayed on the touch panel 41. At this time, if determined image process corresponding to some thumbnail image 411 is stored in the determined image process storage area 234 as the attribute information, this thumbnail image 411 is displayed in a state showing a result of image process on the image file corresponding to this thumbnail image 411. This allows the user to consider whether or not to add another image process while visually confirming the result of the determined image process by the thumbnail images 411.

FIGS. 7(*a*) to 7(*c*) are views showing an example of a display screen of the touch panel 41 when two or more image process have been determined in the process from S4 to S10. As shown in FIG. 7(*a*), when the determination key 4121 is touched with the "left-handed rotation" and "sepia" selected, the "left-handed rotation" and "sepia" are simultaneously applied to the touched thumbnail image 411 as shown in FIG. 7(*b*). As described above, even in the case where a plurality of image process are selected and determined, the user can visually confirm in a moment a result of the applied image process.

Further, in the operation procedure according to the embodiment, as shown in FIG. 7(*a*), the image process keys 415 are first displayed on the touch panel 41. When some image process is selected and the determination key 4121 is touched, the image process keys 415 are disappeared from the touch panel 41. Then, as shown in FIG. 7(*b*), the thumbnail images 411 are displayed on the touch panel 41. This configuration effectively utilizes a limited space of the touch panel 41, thereby largely displays the thumbnail images 411 and image process keys 415 in an easy to view manner. Further, the image process keys 415 and thumbnail images 411 are both displayed at the same area (in the selection area 413), so that the user needs only to pay attention to the selection area 413, resulting in good visibility.

Further, in the embodiment, the image process keys 415 are displayed in the selection area 413 on the touch panel 41 in a 3×4 matrix (3 rows and 4 columns), and the thumbnail images 411 are displayed in a 3×4 matrix (3 rows and 4 columns) as well. That is, the image process keys 415 and thumbnail images 411 are arranged in the same layout. Thus, even in the case where the display is switched from process keys 415 to thumbnail images 411, or conversely, where the display is switched from the thumbnail images 411 to image process keys 415, the user needs only to pay attention to a change in the same area, resulting in good visibility. Further, the user needs only to pay attention to the operation in the same area, resulting in good operability. Thus, the user can continue performing operation without experiencing discomfort even when the display state is switched.

Next, with reference to FIG. 7(*c*) and FIG. 8, a control process performed by the multifunction peripheral 1 according to a second embodiment will be described. In the multifunction peripheral 1 according to the second embodiment, thumbnail images before and after image process corresponding to a touched thumbnail image are displayed side-by-side. In the second embodiment, the same reference numerals as the first embodiment are given to the parts which are common to the first embodiment, and the overlapped description is omitted.

FIG. 8 is a flowchart showing a part of thumbnail image display process performed in the multifunction peripheral 1 according to the second embodiment. The thumbnail image display process according to the second embodiment differs from that of the first embodiment in that steps from S140 to S280 shown in FIG. 8 are executed in place of the steps from S14 to S28 in the flowchart shown in FIG. 5.

The flowchart shown in FIG. 8 shows the process after S12 of FIG. 5, that is, after the user selects and determines an image process, and the thumbnail images 411 are displayed in the selection area 413 on the touch panel 41.

First, in S140 the CPU 21 determines whether or not the thumbnail image 411 displayed on the touch panel 41 has been touched. When the CPU 21 determines that the thumbnail image 411 has been touched by the user (S140: Yes), in S150 the CPU 21 determines whether or not the touched thumbnail image 411 is the selected thumbnail image. When the CPU 21 determines that the touched thumbnail image 411 is the selected thumbnail image (S150: Yes), the CPU 21 returns to S140 and the steps S140 and subsequent steps are repeated.

On the other hand, when the CPU 21 determines that the touched thumbnail image is not the selected thumbnail image (S150: No), in S160 the CPU 21 lights up the touched thumbnail image 411. The CPU 21 controls the touch panel 41 to display, at a coordinate (4,0) in the dialogue area 414, a processed thumbnail image 416 (see FIG. 7(*c*)) that representing a result after the image process, which is stored in the image process type storage area 231 is performed on the image data corresponding to the touched thumbnail image 411.

In S180 the CPU 21 controls the touch panel 41 to display, at a coordinate (5,0) in the dialogue area 414, an unprocessed thumbnail image 417 representing the image before image process is performed, that is, the thumbnail image at the time when the thumbnail image 411 is touched by the user, or the same thumbnail image as the touched thumbnail image 411.

FIG. 7(*c*) is a view showing an example of a display screen of the touch panel 41 in the multifunction peripheral 1 according to the second embodiment. As shown in FIG. 7(*c*), when one thumbnail image 411 is touched, the processed thumbnail image 416 and the unprocessed thumbnail image 417, which correspond to the touched thumbnail image 411, are displayed in the dialogue area 414. As can be seen from FIG. 7(*c*), the processed thumbnail image 416 and the unprocessed thumbnail image 417 have the same size and are arranged side-by-side in the dialogue area 414. In other words, the processed thumbnail image 416 and the unprocessed thumbnail image 417 have the same reduction ratio to an image size of the original image data. With this configuration, the user easily compares the two thumbnail images to thereby adequately determine whether or not to apply the image process. Further, as described later, the processed thumbnail image 416 and the unprocessed thumbnail image 417 function also as the operation key 412.

Returning to FIG. 8, in S190 the CPU 21 determines whether or not the unprocessed thumbnail image 417 has been touched. When the unprocessed thumbnail image 417 has been touched (S190: Yes), in S200 the CPU 21 erases the processed thumbnail image 416 and the unprocessed thumbnail image 417, instead, displays the operation key 412 such as the determination key 4121 and cancel key 4122, and a massage inquiring whether or not the current image process is determined. Subsequently, in S280 the CPU 21 determines whether or not the determination key 4121 displayed at the coordinate (4,0) has been touched by the user. When the CPU 21 makes a positive determination, that is, the CPU 21 determines that the determination key 4121 at the coordinate (4, 0) has been touched (S280: Yes), the CPU 21 proceeds to S30 of the flowchart shown in FIG. 5. When the CPU 21 makes a negative determination, that is, the CPU 21 determines that the determination key 4121 at the coordinate (4, 0) has not been touched, the CPU 21 returns to S140.

On the other hand, when the CPU 21 determines that the unprocessed thumbnail image 417 displayed in the dialogue area 414 has not been touched (S190: No), in S210 the CPU 21 determines whether or not the processed thumbnail image 416 in the dialogue area 414 has been touched. When the CPU 21 determines that the processed thumbnail image 416 has been touched (S210: Yes), the CPU 21 controls the touch panel 41 to replace the touched thumbnail image 411 in the selection area 413 with the unprocessed thumbnail image 417. Subsequently, in S230 the CPU 21 stores the replaced thumbnail image 411 as the selected thumbnail image in the selected image storage area 233, and the CPU 21 proceeds to S200.

When the CPU 21 determines that the unprocessed thumbnail image 417 displayed in the dialogue area 414 has not been touched (S190: No), and when the CPU 21 determines that the processed thumbnail image 416 displayed in the dialogue area 414 has not been touched (S210: No), the CPU 21 proceeds to S200.

In the multifunction peripheral 1 according to the second embodiment, the processed thumbnail image 416 and the unprocessed thumbnail image 417 are simultaneously displayed. This allows the user to adequately determine whether or not to apply the image process to image data corresponding to the processed thumbnail image 416 and the unprocessed thumbnail image 417.

While the invention has been described in detail with reference to the above embodiments thereof, it would be apparent to those skilled in the art that various changes and modifications may be made therein without departing from the spirit of the invention.

For example, although the touch panel 41 provided in the multifunction peripheral 1 is configured to detect a contact of the indicator therewith in the above embodiments, the invention may be applied to case where a touch panel configured to detect proximity of the indicator thereto.

Further, in the above embodiments, image files stored in the memory card are loaded into the image file temporary storage area 230 (see FIG. 2), and the thumbnail images 411 in the respective image files are displayed on the touch panel 41. Alternatively, the invention may suitably be applied to a configuration in which thumbnail data is created from image data scanned by the scanner 3 and thumbnail images corresponding to the created image data are displayed on the touch panel 41. Or, the invention may also be applied to a configuration in which thumbnail images in respective image files received from an external device are displayed on the touch panel 41.

Further, in the first embodiment, when the touched thumbnail image 411 is the selected thumbnail image, that is, an image representing a result of the image process that has already been selected (S16: Yes), in S18 the touched thumbnail image 411 is replaced with a thumbnail image 411 representing a result of process obtained by canceling the most recently selected image process. Alternatively, when the user touches again the selected thumbnail image, the thumbnail image 411 is replaced with an image representing a result when the image process is applied to the image data once again. For example, when the selected thumbnail image shows a result of the image process "right-handed rotation" that is stored in the image process type storage area 231, the currently displayed thumbnail image 411 represents a state where the "right-handed rotation" image process has already been performed on the image data. When the user further touches this selected thumbnail image again, the current thumbnail image 411 (selected thumbnail image) may be replaced with a thumbnail image 411 representing a state where the additional "right-handed rotation" image process has been performed on the image data.

Further, in the thumbnail image display process according to the first embodiment, when a touched thumbnail image is a selected thumbnail image (S16: Yes), in S18 the touched thumbnail image is replaced with a thumbnail image representing a result of process obtained by canceling only the most recently selected image process. Alternatively, the touched thumbnail image may be replaced with a thumbnail image representing a result of process obtained by canceling all the selected image process.

What is claimed is:

1. A non-transitory computer readable storage medium storing a set of program instructions installed on and executed by a computer, the set of program instructions comprising:
 displaying a plurality of display images corresponding to respective ones of a plurality of sets of image data;
 receiving a first instruction and a second instruction, the first instruction indicating selection of a first display image from among the plurality of display images, the first display image corresponding to first image data among the plurality of sets of image data, the second instruction designating an image process;
 replacing the first display image into a first modified display image, the first modified display image being based on the first image data and the image process;
 receiving a third instruction indicating selection of a second display image from among the plurality of display images, the second display image being different from the first display image, the second display image corresponding to second image data among the plurality of sets of image data;
 replacing the second display image into a second modified display image, the second modified display image being based on the second image data and the image process; and
 replacing, in response to reception of prescribed operation, the first modified display image and the second modified display image respectively into the first display image and the second display image.

2. The non-transitory computer readable storage medium according to claim 1,
 wherein the first modified display image and the second modified display image represent the image process.

3. The non-transitory computer readable storage medium according to claim 1,
 wherein the first modified display image the second modified display image are generated according to a manner based on the image process.

4. The non-transitory computer readable storage medium according to claim 1,
 wherein the first modified display image the second modified display image are generated so as to have a same style corresponding to the image process.

5. The non-transitory computer readable storage medium according to claim 1, wherein each of the plurality of display image is a non-modified thumbnail image based on corresponding image data, wherein the first modified display image is a thumbnail image based on the first image data and the image process, and the second modified display image is a thumbnail image based on the second image data and the image process.

6. The non-transitory computer readable storage medium according to claim 1, wherein the image process is configured to correct tone of the image data into sepia tone.

7. The non-transitory computer readable storage medium according to claim 1, wherein when receiving the first instruction, the selection of the first display image is made by a detection of an indicated position on a touch panel, wherein when receiving the third instruction, the selection of the second display image is made by a detection of an indicated position on the touch panel.

8. The non-transitory computer readable storage medium according to claim 1, wherein the plurality of display images is displayed at a specific region of a display, wherein the specific region has m×n divided regions that are obtained by dividing the specific region into m rows and n columns wherein m and n are natural numbers, wherein each of the plurality of display images is displayed on one of the divided regions.

9. The non-transitory computer readable storage medium according to claim 1, wherein the plurality of display images other than the first display image and the second display image which are respectively selection targets of the first instruction and the third instruction, is maintained.

10. The non-transitory computer readable storage medium according to claim 1, wherein the first image data and the second image data respectively represent a first image and the second image, wherein both the first display image and the first modified display image have a same reduction ratio to the first image, wherein both the second display image and the second modified display image have a same reduction ratio to the second image.

11. An image processing apparatus comprising:
a display;
a control device configured to:
displaying a plurality of display images corresponding to respective ones of a plurality of sets of image data on the display;
receive a first instruction and a second instruction, the first instruction indicating selection of a first display image from among the plurality of display images, the first display image corresponding to first image data among the plurality of sets of image data, the second instruction designating an image process;
replace the first display image into a first modified display image, the first modified display image being based on the first image data and the image process;
receive a third instruction indicating selection of a second display image from among the plurality of display images, the second display image being different from the first display image, the second display image corresponding to second image data among the plurality of sets of image data;
replace the second display image into a second modified display image, the second modified display image being based on the second image data and the image process; and
replace, in response to reception of prescribed operation, the first modified display image and the second modified display image respectively into the first display image and the second display image.

12. An image processing method comprising:
displaying a plurality of display images corresponding to respective ones of a plurality of sets of image data;
receiving a first instruction and a second instruction, the first instruction indicating selection of a first display image from among the plurality of display images, the first display image corresponding to first image data among the plurality of sets of image data, the second instruction designating an image process;
replacing the first display image into a first modified display image, the first modified display image being based on the first image data and the image process;
receiving a third instruction indicating selection of a second display image from among the plurality of display images, the second display image being different from the first display image, the second display image corresponding to second image data among the plurality of sets of image data;
replacing the second display image into a second modified display image, the second modified display image being based on the second image data and the image process; and
replacing, in response to reception of prescribed operation, the first modified display image and the second modified display image respectively into the first display image and the second display image.

* * * * *